United States Patent
Kanumuri et al.

(10) Patent No.: US 9,967,418 B1
(45) Date of Patent: May 8, 2018

(54) PLATFORM DMFT AND INTERACTION WITH IHV DMFT

(71) Applicant: Microsoft Technology Licensing, LLC, Redmond, WA (US)

(72) Inventors: Sandeep Kanumuri, Redmond, WA (US); Naveen Thumpudi, Redmond, WA (US); Sathyanarayanan Karivaradaswamy, Sammamish, WA (US); Rui Zhao, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 15/339,587

(22) Filed: Oct. 31, 2016

(51) Int. Cl.
*H04N 1/00* (2006.01)
*G06F 9/44* (2006.01)
*G06F 13/10* (2006.01)
*H04N 21/443* (2011.01)

(52) U.S. Cl.
CPC ....... *H04N 1/00962* (2013.01); *G06F 9/4411* (2013.01); *G06F 13/102* (2013.01); *H04N 1/00938* (2013.01); *H04N 21/4431* (2013.01); *H04N 2201/0084* (2013.01)

(58) Field of Classification Search
None
See application file for complete search history.

(56) References Cited

U.S. PATENT DOCUMENTS

| | | | |
|---|---|---|---|
| 5,745,761 A | 4/1998 | Celi et al. | |
| 6,289,396 B1 | 9/2001 | Keller et al. | |
| 7,493,614 B2 | 2/2009 | Liu et al. | |
| 7,555,554 B2 | 6/2009 | Manders et al. | |
| 7,596,180 B2 | 9/2009 | Sullivan et al. | |
| 8,832,720 B2 | 9/2014 | Paves et al. | |
| 9,411,761 B2 | 8/2016 | Fenelon et al. | |
| 2006/0095850 A1* | 5/2006 | Miller | G11B 27/034 715/719 |
| 2016/0210159 A1* | 7/2016 | Wilson | G06F 9/4411 |

(Continued)

OTHER PUBLICATIONS

"Developing Metro style Device Apps for Cameras", http://feishare.com/attachments/upload/metro-device-app-camera.pdf, Published on: May 31, 2012, 47 pages.

(Continued)

*Primary Examiner* — Shahbaz Nazrul
(74) *Attorney, Agent, or Firm* — Arent Fox LLP

(57) ABSTRACT

The present disclosure provides devices and techniques for processing a media capture stream captured by a camera device using a chain device media foundation transform (DMFT). The techniques include configuring multiple DMFTs such that an original manufacturer (OEM) may have flexibility in independently selecting various functionalities from different sources (e.g., OS, OEM, IHV, ISV, or VARs) in order to maximize hardware capabilities while minimizing the drawbacks of creating a single DMFT. To that end, the implementation of the present disclosure includes a devices and techniques of chainable DMFTs such that a device transform manager may select a set of functionalities (e.g., face recognition, color effects, etc.) from multiple vendors to customize the camera's capabilities according to the OEM specification.

20 Claims, 4 Drawing Sheets

(56) References Cited

U.S. PATENT DOCUMENTS

2016/0286120 A1 9/2016 Kuo et al.
2017/0346792 A1* 11/2017 Nataros ............... H04L 63/0428

OTHER PUBLICATIONS

"Creating a camera driver MFT for a Windows Store device app", http://web.archive.org/web/20131219011111/http:/msdn.microsoft.com/en-us/library/windows/hardware/dn394064(v=vs.85).aspx, Published on: Dec. 19, 2013, 10 pages.
"Camera", http://sysdev.microsoft.com/en-us/Hardware/oem/docs/Driver_Components/Camera, Published on: Jul. 10, 2015, 3 pages.
"How to set up and run Wowza Transcoder for live streaming", https://www.wowza.com/forums/content.php?304-How-to-set-up-and-run-Wowza-Transcoder-for-live-streaming, Published on: Oct. 5, 2011, 20 pages.

* cited by examiner

PLATFORM DMFT AND INTERACTION WITH IHV DMFT

BACKGROUND

In computer systems, device media foundation transform (DMFT) extends the driver functionalities to allow an original equipment manufacturer (OEM)(e.g., camera manufacturer) to distinguish their system from others on the market. Particularly, the OEMs may offer customization of vendor specific features that extend the base capabilities generally afforded by the operating system. The OEMs may achieve the customization by developing DMFT that implements the desired custom effects and features on the camera device.

Developing the software module for the DMFT, however, generally requires the OEM to coordinate closely with independent hardware vendors (IHVs) that may provide one or more hardware equipment for the camera (e.g., sensors) and the operating system developer to build a single DMFT to the specifications of the OEM. Such coordination may be difficult when there are large number of hardware vendors. Additionally, implementing subsequent updates (e.g., OEM may offer new features) to the existing DMFT may be cumbersome because it may require the OEM to return to the same IHVs that originally assisted in creating the original DMFT in order to provide the required updates. Thus, the conventional system of developing the DMFT lacks sufficient flexibility.

SUMMARY

The techniques described herein configure multiple DMFTs such that an OEM may have flexibility in independently selecting various functionalities from different sources (e.g., OS, OEM, IHV, independent software vendor (ISV), or value add reseller (VARs)) in order to maximize hardware capabilities while minimizing the drawbacks of creating a single DMFT. To that end, the implementation of the present disclosure includes a system and method of chainable DMFTs such that a device transform manager may select a set of functionalities (e.g., face recognition, color effects, etc.) from multiple vendors to customize the camera's capabilities according to the OEM specification.

One example implementation relates to a method for processing a media capture stream captured by a camera device using a chain DMFT. The method may include identifying, at an operating system executing on a computer device, one or more functionalities of a platform DMFT provided by the operating system. The method may further include determining whether to extend or overlap the identified one or more functionalities of the platform DMFT, and selecting a subset of DMFTs from a set of available DMFTs based on the determining. The method may further include chaining the subset of DMFTs in a specified order. The specified order may identify a sequence in which the media capture stream is processed by the selected subset of DMFTs. The method may further include enabling the chained subset of DMFTs to process the media capture stream based on the specified order.

Another example implementation relates to a computer device for processing a media capture stream captured by a camera device using a chain DMFT. The computer device may include a memory to store data and instructions, and a processor in communication with the memory. The computer device may further include an operating system in communication with the memory and the processor. The operating system may be operable to identify, at an operating system executing on a computer device, one or more functionalities of a platform DMFT provided by the operating system. The operating system may be further operable determine whether to extend or overlap the identified one or more functionalities of the platform DMFT, and select a subset of DMFTs from a set of available DMFTs based on the determining. The operating system may further chain the subset of DMFTs in a specified order. The specified order may identify a sequence in which the media capture stream is processed by the selected subset of DMFTs. The operating system may further enable the chained subset of DMFTs to process the media capture stream based on the specified order.

Another example implementation relates to computer-readable medium for processing a media capture stream captured by a camera device using a chain DMFT. The computer-readable medium may include instructions for identifying, at an operating system executing on a computer device, one or more functionalities of a platform DMFT provided by the operating system. The instructions may further be executable for determining whether to extend or overlap the identified one or more functionalities of the platform DMFT, and selecting a subset of DMFTs from a set of available DMFTs based on the determining. The instructions may further be executable for chaining the subset of DMFTs in a specified order. The specified order may identify a sequence in which the media capture stream is processed by the selected subset of DMFTs. In some examples, the instructions may further be executable for enabling the chained subset of DMFTs to process the media capture stream based on the specified order.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
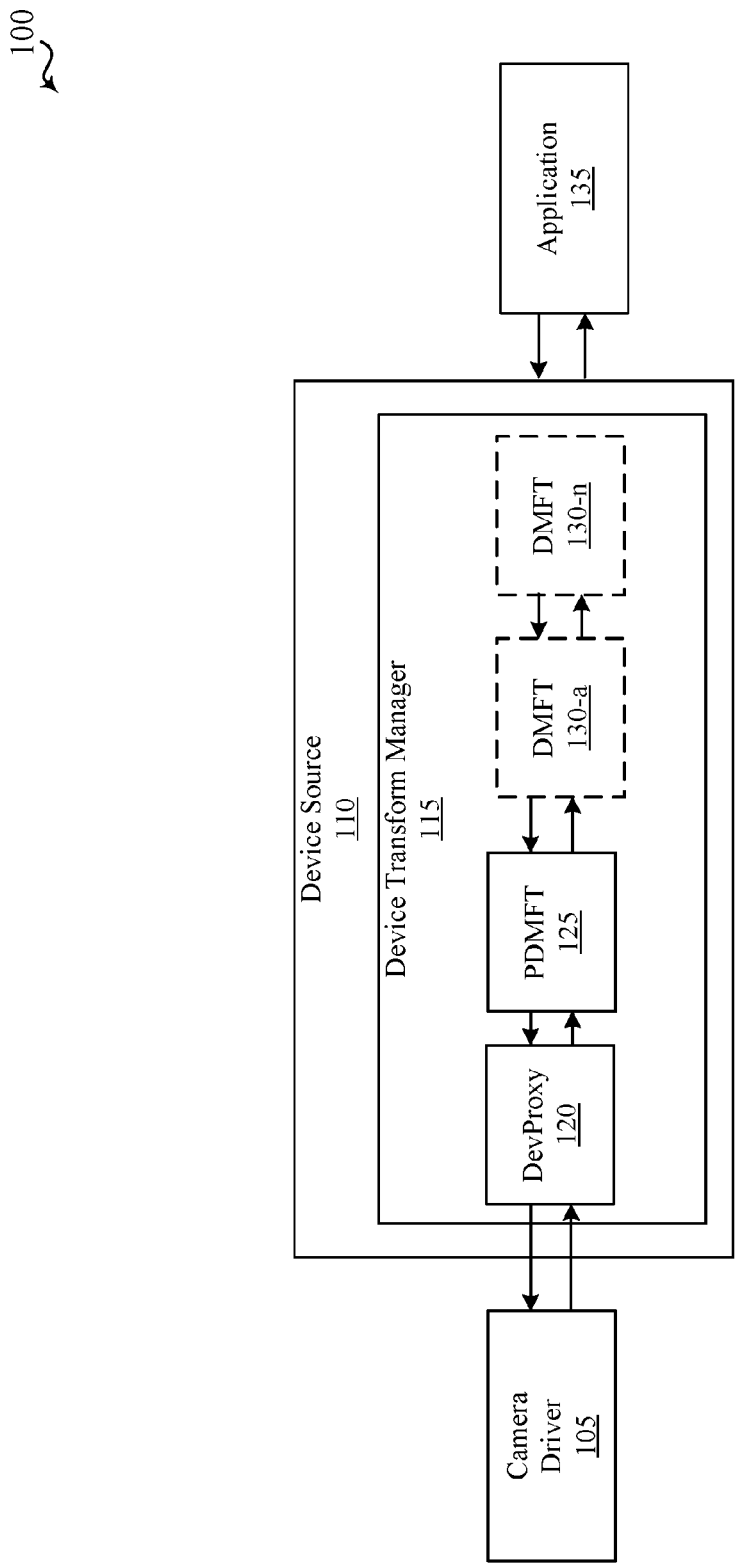
FIG. 1 is a schematic diagram of an example computer device in which features of the present disclosure may operate.

As noted, OEMs may distinguish their camera systems from others on the market by including effects (e.g., face detection, video stabilization, etc.) on the media capture streams that may be distinguishable from similar camera systems from other manufacturers. Currently, if an OEM wants to customize the vendor specific features by extending the IHV DMFT (e.g., a DMFT provided by a hardware vendor), the OEM may need to modify the IHV code to add the appropriate functionalities, which would make the code difficult to maintain if both IHV and OEM routinely update their code. Further, integrating the different codes from OEM and IHV may, in some examples, result in issues with incapability.

The techniques described herein provide a built-in Platform DMFT, which supplies commonly used features (e.g., video editing, image preview, etc.) across multiple manufacturers. Through DMFT chaining, the IHVs and OEMs may provide, in their respective DMFTs (e.g., IHV DMFT and OEM DMFT), additional features that either overlap or extend the capabilities of the Platform DMFT supplied by the OS developer by including features that may be absent in the Platform DMFT. For example, the additional features may overlap with the capabilities of the Platform DMFT by providing video editing similar to the Platform DMFT, but with minor variations. Additionally or alternatively, the additional features may extend with the capabilities of the Platform DMFT by providing, for example, video stabilization features that may be absent from the Platform DMFT.

With DMFT chaining, OEMs may be able to leverage the features in a Platform DMFT and IHV DMFTs without modifying the code associated with either the Platform DMFT or the IHV DMFT. Thus, OEMs may adaptively select which DMFTs to use to enable the desired effects for their camera systems. For example, a first OEM may use a face detection feature from the Platform DMFT, and may use video stabilization from the IHV DMFT. In contrast, in another example, a second OEM may use a face detection feature from the IHV DMFT and video stabilization and temporal de-noising from the OEM supplied DFMT.

Various implementations are now described in more detail with reference to the FIGS. 1-4. In the following description, for purposes of explanation, numerous specific details are set forth in order to provide a thorough understanding of one or more implementations. It may be evident, however, that such implementation(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples Turning first to FIG. 1, a computer device architecture 100 includes an integration of a camera driver 105, a device source 110, and one or more applications 135 to provide unique functionalities of a camera device and image/video processing. In some examples, a media capture stream captured by the camera device may be processed through one or more of the camera driver 105, the device source 110, and the applications 135. The computer device architecture 100 illustrates a device transfer manager 115 (DTM), included in the device source, for flexibly selecting one or more functionalities independently from one or more sources (e.g., OS, OEM, IHV) to create a set of pipeline that executes queried capabilities configurable for each unique camera system without the drawbacks of the conventional systems.

The camera driver 105 may be a type of device driver that operates or controls a particular type of device (e.g., camera, camera phone, or a computer coupled with the camera). In some examples, the camera driver 105 may provide a software interface to the hardware of the camera device, enabling the operating systems and other computer programs to access the hardware functions without needing to know precise details of the hardware. Applications 135 may be one or more applications stored on the computer device for providing custom user interface to the user of the camera device. For example, applications 135 may include metro style device applications that enable users to easily access unique device features (e.g., allowing the user to modify the background or image/video with unique effects) from one or more applications 135 stored on the computer device.

In some examples, the device transform manager 115 may include a device proxy 120, platform DMFT 125 that may be provided by the operating system developer based on the commonly used features, and one or more DMFTs 130 that may be a combination of IHV DMFT and/or OEM DMFT. In some examples, the DMFTs 130 may be optional except Device proxy 120. Particularly, if no DMFT is enabled, device source 110 may create a device proxy 120 instance instead of a DTM instance. In some examples, OEMs may selectively add or remove DMFTs 130 to the chain and update the camera driver (e.g., update the driver .inf file). The device transform manager 115 may instantiate the one or more DMFTs 130 and add them to the chain based on the settings in the camera driver 105 (i.e., in the driver .inf file). Although FIG. 1 illustrates only two DMFTs 130, it should be appreciated that additional (or less) DMFTs may be included in the DMFT chain in accordance with features of the present disclosure.

In some examples, the media capture samples may flow from the camera driver to the device proxy before being processed by the DMFT chain that includes one or more DMFTs 130. Each DMFT 130 in the chain may process the sample in accordance with one or more configurations of the DMFT 130. However, if any particular DMFT 130 cannot process the sample and/or does not want to process the sample, the said DMFT 130 may forward the capture sample to the next DMFT 130 in the chain without performing one or more functions on the sample.

Because an error in instantiating any one of the DMFTs 130 may be a fatal error to the device transform manager 115, features of the present disclosure implement DMFT guidelines to ensure proper compliance between the IHV DMFT, OEM DMFT, and the OS DMFT. For example, the input pin count of the one or more DMFTs 130 must match with the output pin count of the previous DFMT 130. For example, the input pin count of DMFT 130-$n$ must match the output pin count of DMFT 130-$a$ that may immediately precede DMFT 130-$n$. However, it should be noted that the input and output pin counts of the same DMFT may not match. For example, the input pin count of DMFT 130-$a$ may be different from its output pin count, while still conforming to the guideline of the input pin count of DMFT 130-$n$ matching the output pin count of DMFT 130-$a$.

In addition to adding and removing the DMFTs 130 from the DMFT chain, the device transform manager 115 may also be configured to enable or disable one or more of platform DMFT 125 or the DMFTs 130 based on the specifications of the OEM. Thus, the disclosed method and system allow for multiple DMFTs to run at the same time such that OEM, OS, and the IHVs may be independently responsible for their own respective DFMTs. For any updates to the existing DMFT, the OEM may not need to retrace its original steps to generate a single comprehensive DMFT. Instead, the device transform manager 115 may be configured to selectively remove and replace a particular DMFT 130 from the chain as the need arises (e.g., while implementing functionality updates).

Figure 2:
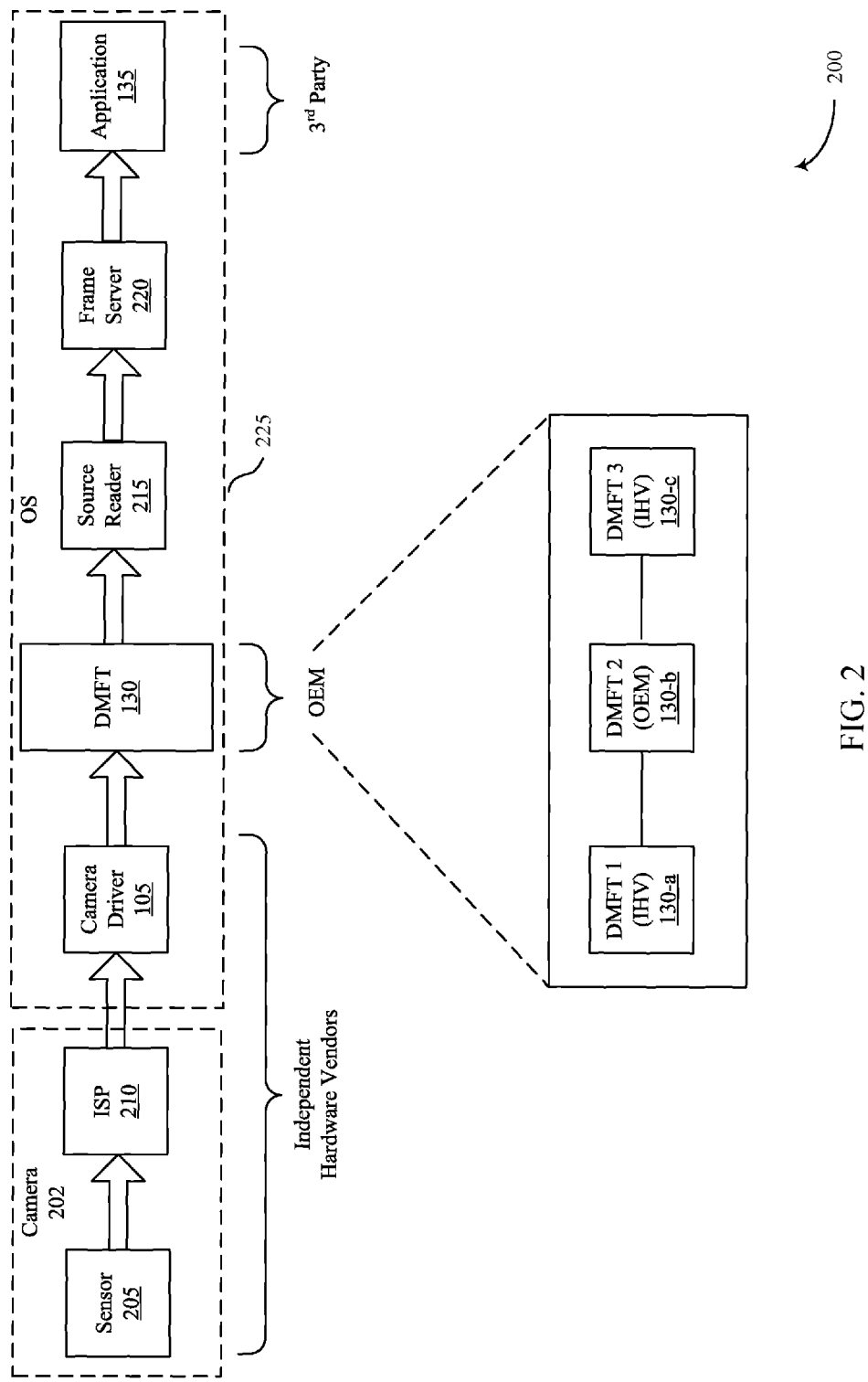
FIG. 2 is another schematic diagram of an example computer device in which features of the present disclosure may operate.

FIG. 2 is another schematic diagram 200 of an example of a computer device in which features of the present disclosure may operate. The schematic diagram 200 illustrates the interaction between a camera 202 and the operating system 225 implemented on camera 202 or a different stand-alone computer device 100 (FIG. 1) processing images captured by the camera. In some examples, diagram 200 may illustrate an image capture and processing flow to process one or more media capture streams captured by the sensor 205 of camera device 202. The media capture stream may be an image stream or a video stream. The sensors 205 incorporated into camera 202 may include image sensors that detect and convey the information that may constitute an image or video. For example, sensors 205 (e.g., digital sensors) may use complementary metal-oxide-semiconductor (CMOS) technology. It should be appreciated that the type of technology utilized for image sensors should not be construed as limiting, but may include any type of sensors configurable for camera device 100. For digital cameras, the camera 202 may rely on one or more sensors 205 to record the image or video.

The captured camera stream may be processed by an image signal processor (ISP) 210. The ISP 210 may perform demosaicing (e.g., evaluating the color and brightness data of a given pixel), reducing noise (e.g., separating the noise from the image information), and/or image sharpening. The ISP 210 processed capture sample may be forwarded to the camera driver 105. The combination of sensors 205, ISP 210, and camera drivers 105 may be provided to the OEM by one or more IHVs. Each IHV may further provide a DFT associated with their respective hardware that may extend the capabilities of the camera device 100 beyond those provided by the platform DMFT (see FIG. 1).

In order to reduce the complexities of incorporating the DFTs from multiple vendors without integrating complex source code, the OEM may employ the techniques of the present disclosure that utilize a device transform manager 115 to dynamically select and enable/disable one or more IHVs that may be supplied from IHV or OEM. Thus, to the extent that the device transform manager 115 determines that any desired functionality is not supported by the base platform DMFT supplied by the OS developer, the device transform manager 115 may select a subset of DMFTs from a set of DMFTs independently supported and maintained by IHV and OEM. As such, in some example, the device transform manager 115 may select a first functionality from a DMFT offered by a first IHV (e.g., first DMFT 130-a), and select a second functionality from a DMFT offered by the OEM (e.g., second DMFT 130-b), and further select a third DMFT offered by a third IHV (e.g., third DMFT 130-c). In the above instance, each camera device 100 may be uniquely configurable in accordance with the specifications set forth by the OEM.

Moreover, because the device transform manager 115 chains each of the selected DMFTs 130 in a specified order to process the captured camera stream (e.g., first applying face recognition using the first DMFT followed by image sharpening using the second DMFT), the OEM may avoid modifying the IHV code to incorporate multiple functionalities into a single DMFT. Further, with DMFT chaining, the device transform manager 115 may leverage the features in platform DMFT, IHV DMFTs, and OEM DMFTs without the requirement of the multiple vendors and OEMs coordinating to develop a single DMFT. In some examples, a different DMFT chain may be selected for multiple cameras developed by the same OEM in order to provide unique characteristics to the one or more camera devices.

The output of the DMFT 130 is forwarded to the source reader 215 and the frame server 220 of the operating system before being made available to an application 135. As noted, an application 135 may include a metro style device application provided by an OEM that enable users to utilize a user interface to access the unique features of the camera device 100.

Figure 3:
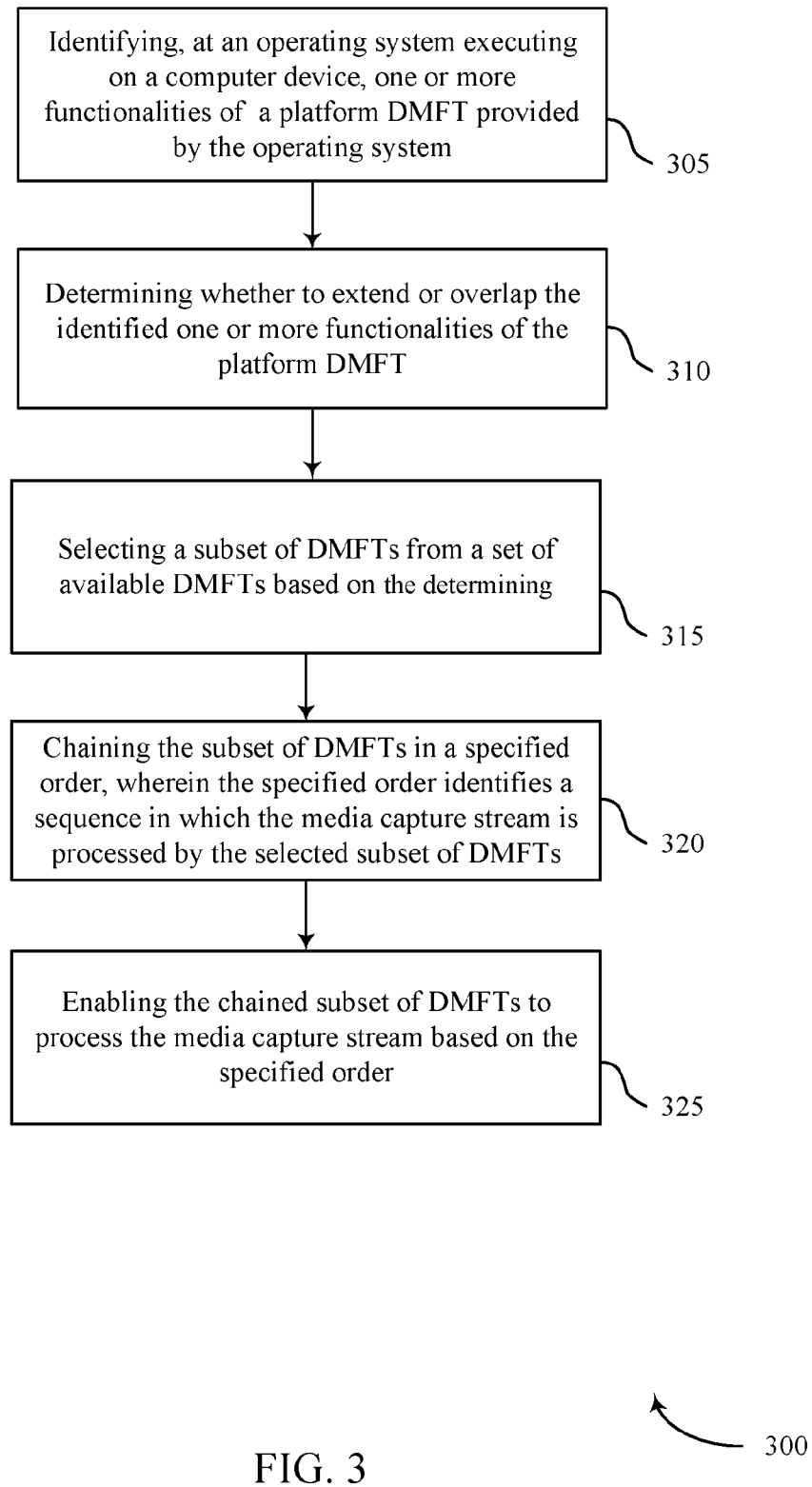
FIG. 3. is a flow chart of a method implemented on the computer device in accordance with various implementations of the present disclosure.

Referring to FIG. 3, an example method 300 for processing a media capture stream captured by a camera device using a chain DMFT is described. The method 300 may be performed by the computer device 100 as described with reference to FIGS. 1-2. Although the method 300 is described below with respect to the elements of the camera device 100, other components may be used to implement one or more of the steps described herein.

At block 305, the method 300 may include identifying, at an operating system executing on a computer device, one or more functionalities of a platform DMFT provided by the operating system. In some examples, the platform DMFT may be provided by the operating system that includes a plurality of functionalities commonly used by multiple OEMs (e.g., image and video editing, image and video stabilization). In some examples, the one or more functionalities may be selected from a group comprising face recognition feature, image stabilization, facial feature analysis, facial expression analysis, noise reduction, geometric transformation, depth estimation, scene analysis, motion detection, privacy control, fusion of multi-sensor data, pose analysis, landmark analysis, or image editing. Implementations of block 305 may be performed by the device transform manager 115 described with reference to FIG. 4.

At block 310, the method 300 may include determining whether to extend or overlap the identified one or more functionalities of the platform DMFT. For example, if the device transform manager 115 determines that the one or more sought functionalities (e.g., face recognition) that OEM intends to incorporate into its camera device is not included in the platform DMFT (or if the device transform manager 115 determines that an overlapping functionality that is present in the platform DMFT, but may be better handled by an OEM DMFT, IHV DMFT, ISV DMFT, or VAR DMFT), the device transform manager 115 may elect to add one or more DMFTs from the available DMFTs to distinguish the camera device from other manufacturers that would otherwise be limited to platform DMFT functionalities. Implementations of block 310 may also be performed by the device transform manager 115 described with reference to FIG. 4.

At block 315, the method 300 may include selecting a subset of DMFTs from a set of available DMFTs based on the determining whether to extend or overlap the identified one or more functionalities of the platform DMFT. The set of available DMFTs may include one or more independent hardware vendor (IHV) DMFTs, original manufacturer (OEM) DMFTs, operating system DMFTs, independent software vendor (ISV) DMFTs, or value add reseller (VARs) DMFTs. Features of the present disclosure, when selecting the subset of DMFTs from the set of available DMFTs may include determining whether to extend (e.g., include functionalities not supported by the platform DMFT) or overlap (e.g., include functionalities that are supported by the platform DMFT, but the processing of the supported functionalities may be better handled by the available DMFTs that include OEM DMFT, IHV DMFT, ISV DMFT, or VAR DMFT). Thus, in some examples, the DMFT selection component 425 may select the subset of DMFTs based on the determining whether to extend or overlap the functionalities supported by the platform DMFT.

In some examples, selecting the subset of DMFTs from the set of available DMFTs may include determining whether an existing chain DMFT extends or overlaps the identified one or more functionalities of the platform DMFT. Stated differently, the DMFT selection component 425 may attempt to identify a previously generated chained DMFT that may satisfy the requirements of the OEM without requiring a new chain to be generated. Thus, the method 300, in some examples, may include selecting the subset of DMFTs from the set of available DMFTs based on the determining that the existing chain DMFT fails to extend or overlap the identified one or more functionalities of the platform DMFT. Alternatively, the method 300, may include selecting the existing chain DMFT based on the determining that the existing chain DMFT extend or overlap the identified one or more functionalities of the platform DMFT. Implementations of block 315 may be performed by DMFT selection component 425 described with reference to FIG. 4.

At block 320, the method 300 may include chaining the subset of DMFTs in a specified order. The specified order may identify a sequence in which the media capture stream is processed by the selected subset of DMFTs. For example, the DMFT chaining component 430 may select a first DMFT developed by the IHV to process the media capture stream first (e.g., applying face recognition to the stream), followed by a second DMFT developed by the OEM to process the media capture stream second (e.g., apply image sharpness to the sample outputted by the first DMFT). It should be understood that the order in which the DMFTs may be established may be dependent on the OEM specification. Thus, once chained, the output of the first DMFT may be an input to the second DMFT, wherein the first DMFT and the second DMFT are developed independently by one or both of OEM or IHV.

In some examples, the chained subset of DMFTs may be maintained, updated, or modified without requiring the OEM to continuously retrace its earlier steps. For example, the DMFT chaining component 430 may determine whether to update any one or more functionalities included in the camera device, and replace one of the selected DMFTs from the subset of DMFTs for the update. Thus, in some examples, the DMFT chaining component 430 may selectively edit or replace one functionality of the camera device by replace the previously selected DMFT with an updated DMFT. Such modification may be achieved without disturbing the functions of the other DMFTs that are not replaced. Implementations of block 320 may be performed by the DMFT chaining component 430 described with reference to FIG. 4.

At block 325, the method 300 may include enabling the chained subset of DMFTs to process the media capture stream based on the specified order. Each DMFT in the subset of the DMFTs may process the media capture stream in the specified order. However, if one or more selected DMFTs does not (or cannot) process a particular sample of the media capture stream, the particular DMFT may pass (or "forward") the received media capture stream to the next DMFT without processing. Implementations of block 325 may be performed by DMFT chaining component 430 described with reference to FIG. 4.

Figure 4:
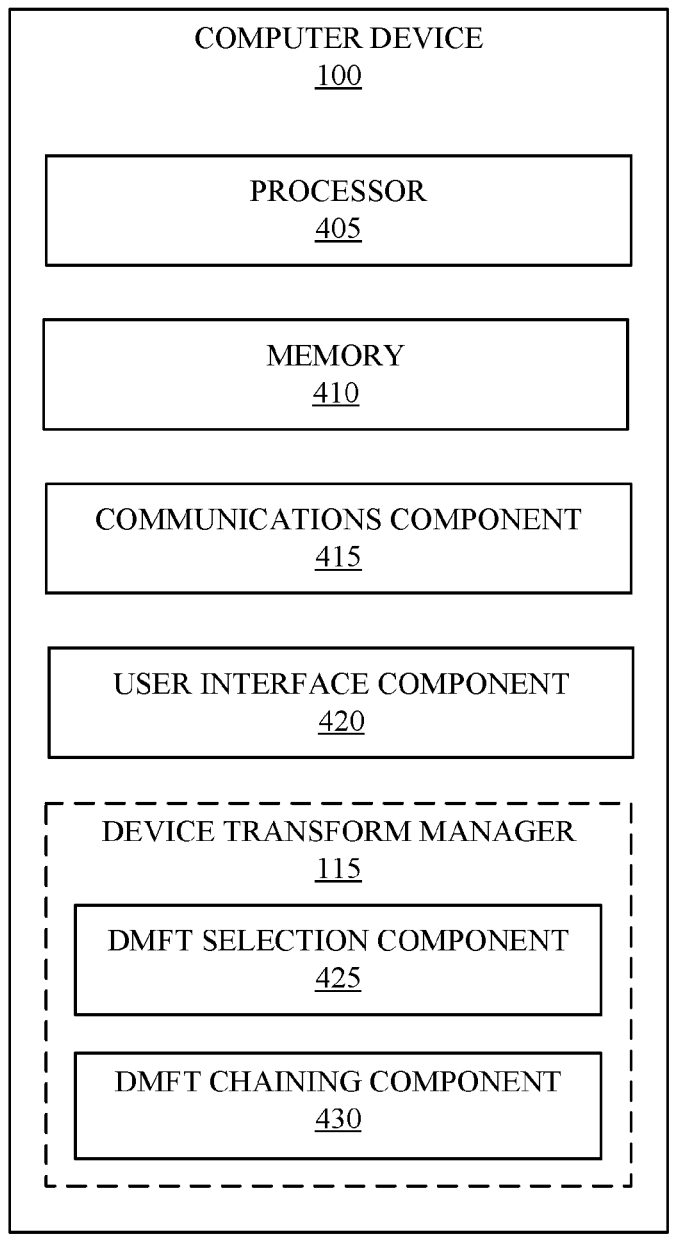
FIG. 4 is a diagram illustrating an example of a hardware implementation for a computer device in accordance with an implementation of the present disclosure.

Referring now to FIG. 4, a diagram illustrating an example of a hardware implementation for the computer device 100 in accordance with various implementations of the present disclosure is described. In some examples, the camera device 100 may include a processor 405 for carrying out one or more processing functions (e.g., method 300) described herein. The processor 405 may include a single or multiple set of processors or multi-core processors. Moreover, the processor 405 can be implemented as an integrated processing system and/or a distributed processing system. In some examples, processor 405 may be an example of image signal processor (ISP) 210 described with reference to FIG. 2.

The computer device 100 may further include memory 410, such as for storing local versions of applications being executed by the processor 405. For example, the memory 410 may be implemented as a single memory or partitioned memory. In some examples, the operations of the memory 410 may be managed by the processor 405. Memory 410 can include a type of memory usable by a computer, such as random access memory (RAM), read only memory (ROM), tapes, magnetic discs, optical discs, volatile memory, non-volatile memory, and any combination thereof. Additionally, the processor 405, and memory 410 may include and execute operating system (not shown).

Further, computer device 100 may include a communications component 415 that provides for establishing and maintaining communications with one or more parties utilizing hardware, software, and services as described herein. Communications component 415 may carry communications between components on camera device 100, as well as between camera device 100 and external devices, such as devices located across a communications network and/or devices serially or locally connected to computer device 100. For example, communications component 415 may include one or more buses, and may further include transmit chain components and receive chain components associated with a transmitter and receiver, respectively, operable for interfacing with external devices.

Computer device 100 may also include a user interface component 420 operable to receive inputs from a user of computer device 100 and further operable to generate outputs for presentation to the user. User interface component 420 may include one or more input devices, including but not limited to a touch-sensitive display, a navigation key, a function key, a microphone, a voice recognition component, keyboard, any other mechanism capable of receiving an input from a user, or any combination thereof. Further, user interface component 420 may include one or more output devices, including but not limited to a display, a speaker, any other mechanism capable of presenting an output to a user, or any combination thereof.

The computer device 100 may also include device transform manager 115 to select and enable one or more DMFTs to perform functions to the media capture stream. In some examples, the device transform manager 115 may be an example of device transform manager 115 described with reference to FIGS. 1-2. The process of selecting a subset of DMFTs from available DMFTs may be performed by DMFT selection component 425 that is part of the device transform manager 115. The device transform manager 115 may further include a DMFT chaining component 430 for chaining (or attaching) the IHV or OEM supplied DMFTs in a linked order to process the media capture stream.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device (e.g., computer device 100), which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. In contract, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any implementation described herein as "exemplary" is not necessarily to be construed as preferred or advantageous over other implementation. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various implementations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various implementations or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with implementations disclosed herein.

What is claimed is:

1. A method for processing a media capture stream captured by a camera device using a chain device media foundation transform (DMFT), comprising:
   identifying, at an operating system executing on a computer device, one or more functionalities of a platform DMFT provided by the operating system;
   determining whether to extend or overlap the identified one or more functionalities of the platform DMFT;
   selecting a subset of DMFTs from a set of available DMFTs based on the determining;
   chaining the subset of DMFTs in a specified order, wherein the specified order identifies a sequence in which the media capture stream is processed by the selected subset of DMFTs; and
   enabling the chained subset of DMFTs to process the media capture stream based on the specified order.

2. The method of claim 1, further comprising:
   determining whether to update the one or more functionalities included in the camera device; and
   replacing a DMFT from the selected subset of DMFTs based on the determining.

3. The method of claim 1, wherein selecting the subset of DMFTs from the set of available DMFTs based on determining whether to extend or overlap comprises:
   determining whether an existing chain DMFT extends or overlaps the identified one or more functionalities of the platform DMFT.

4. The method of claim 3, further comprising:
   selecting the subset of DMFTs from the set of available DMFTs based on the determining that the existing chain DMFT fails to extend or overlap the identified one or more functionalities of the platform DMFT; or
   selecting the existing chain DMFT based on the determining that the existing chain DMFT extend or overlap the identified one or more functionalities of the platform DMFT.

5. The method of claim 1, wherein the one or more functionalities are selected from a group comprising face recognition, facial feature analysis, facial expression analysis, noise reduction, geometric transformation, depth estimation, scene analysis, motion detection, privacy control, fusion of multi-sensor data, pose analysis, landmark analysis, image stabilization, or image editing.

6. The method of claim 1, wherein a DMFT of the subset of DMFTs provides functionalities that extend capability of a camera driver and are unique to an original manufacturer (OEM).

7. The method of claim 1, wherein the set of available DMFTs include one or more independent hardware vendor (IHV) DMFTs, original manufacturer (OEM) DMFTs, operating system DMFTs, independent software vendor (ISV) DMFTs, or value add reseller (VARs) DMFTs.

8. A computer device for processing a media capture stream captured by a camera device using a chain device media foundation transform (DMFT) comprising:
   a memory to store data and instructions;
   a processor in communication with the memory; and
   an operating system in communication with the memory and the processor, wherein the operating system is operable to:
      identify, at an operating system executing on the computer device, one or more functionalities of a platform DMFT provided by the operating system;
      determine whether to extend or overlap the identified one or more functionalities of the platform DMFT;
      select a subset of DMFTs from a set of available DMFTs based on the determining;
      chain the subset of DMFTs in a specified order, wherein the specified order identifies a sequence in which the media capture stream is processed by the selected subset of DMFTs; and
      enable the chained subset of DMFTs to process the media capture stream based on the specified order.

9. The computer device of claim 8, wherein the instructions are further executable by the processor to:
   determine whether to update the one or more functionalities included in the camera device; and
   replace a DMFT from the selected subset of DMFTs based on the determining.

10. The computer device of claim 8, wherein the instructions to select the subset of DMFTs from the set of available DMFTs based on determining whether to extend or overlap comprises, further include instructions executable by the processor to:
    determine whether an existing chain DMFT extends or overlaps the identified one or more functionalities of the platform DMFT.

11. The computer device of claim 10, wherein the instructions are further executable by the processor to:
    select the subset of DMFTs from the set of available DMFTs based on the determining that the existing chain DMFT fails to extend or overlap the identified one or more functionalities of the platform DMFT; or
    select the existing chain DMFT based on the determining that the existing chain DMFT extend or overlap the identified one or more functionalities of the platform DMFT.

12. The computer device of claim 8, wherein the one or more functionalities are selected from a group comprising face recognition, facial feature analysis, facial expression analysis, noise reduction, geometric transformation, depth estimation, scene analysis, motion detection, privacy control, fusion of multi-sensor data, pose analysis, landmark analysis, image stabilization, or image editing.

13. The computer device of claim 8, wherein a DMFT of the subset of DMFTs provides functionalities that extend capability of a camera driver and are unique to an original manufacturer (OEM).

14. The computer device of claim 8, wherein the set of available DMFTs include one or more independent hardware vendor (IHV) DMFTs, original manufacturer (OEM) DMFTs, operating system DMFTs, independent software vendor (ISV) DMFTs, or value add reseller (VARs) DMFTs.

15. A non-transitory computer-readable medium for processing a media capture stream captured by a camera device using a chain device media foundation transform (DMFT) comprising instructions for:
    identifying, at an operating system executing on a computer device, one or more functionalities of a platform DMFT provided by the operating system;
    determining whether to extend or overlap the identified one or more functionalities of the platform DMFT; and
    selecting a subset of DMFTs from a set of available DMFTs based on the determining;
    chaining the subset of DMFTs in a specified order, wherein the specified order identifies a sequence in which the media capture stream is processed by the selected subset of DMFTs; and
    enabling the chained subset of DMFTs to process the media capture stream based on the specified order.

16. The non-transitory computer-readable medium of claim 15, wherein the instructions are further executable for:
    determining whether to update the one or more functionalities included in the camera device; and
    replacing a DMFT from the selected subset of DMFTs based on the determining.

17. The non-transitory computer-readable medium of claim 15, wherein the instructions for selecting the subset of DMFTs from the set of available DMFTs based on determining whether to extend or overlap are further executable for:
    determining whether an existing chain DMFT extends or overlaps the identified one or more functionalities of the platform DMFT.

18. The non-transitory computer-readable medium of claim 17, wherein the instructions are further executable for:
    selecting the subset of DMFTs from the set of available DMFTs based on the determining that the existing chain DMFT fails to extend or overlap the identified one or more functionalities of the platform DMFT; or
    selecting the existing chain DMFT based on the determining that the existing chain DMFT extend or overlap the identified one or more functionalities of the platform DMFT.

19. The non-transitory computer-readable medium of claim 15, wherein the one or more functionalities are selected from a group comprising face recognition, facial feature analysis, facial expression analysis, noise reduction, geometric transformation, depth estimation, scene analysis, motion detection, privacy control, fusion of multi-sensor data, pose analysis, landmark analysis, image stabilization, or image editing.

20. The non-transitory computer-readable medium of claim 15, wherein the set of available DMFTs include one or more independent hardware vendor (IHV) DMFTs, original manufacturer (OEM) DMFTs, operating system DMFTs, independent software vendor (ISV) DMFTs, or value add reseller (VARs) DMFTs.

* * * * *